US012381717B2

(12) United States Patent
Dover

(10) Patent No.: US 12,381,717 B2
(45) Date of Patent: Aug. 5, 2025

(54) GENERATING A SHARED SECRET FOR AN ELECTRONIC SYSTEM

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 214 days.

(21) Appl. No.: 18/221,790

(22) Filed: Jul. 13, 2023

(65) Prior Publication Data

US 2024/0073002 A1 Feb. 29, 2024

Related U.S. Application Data

(60) Provisional application No. 63/402,626, filed on Aug. 31, 2022.

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3278* (2013.01)

(58) Field of Classification Search
CPC ... H04L 9/0825; H04L 9/0866; H04L 9/3278; H04L 9/0844; H04L 9/08
See application file for complete search history.

(56) References Cited

U.S. PATENT DOCUMENTS

| | | | | |
|---|---|---|---|---|
| 2007/0266443 | A1* | 11/2007 | Wilson | G11B 20/00086 726/27 |
| 2014/0244993 | A1* | 8/2014 | Chew | G06F 9/4406 713/2 |
| 2019/0190704 | A1* | 6/2019 | Srivastava | H04L 63/0428 |

* cited by examiner

*Primary Examiner* — Quazi Farooqui
(74) *Attorney, Agent, or Firm* — Holland & Hart LLP

(57) ABSTRACT

Methods, systems, and devices for techniques for generating a shared secret for an electronic system are described. A memory system may identify an initial key pair and exchange a public key of the key pair with a public key associated with a server. The memory system and the server may each generate a shared secret. In some cases, the memory system and the server may use the shared secret to generate a device identifier for the memory system, for example by incorporating the device identifier into a cryptographic representation of a software layer of the memory system. The memory system and the server may use the device identifier to generate one or more asymmetric key pairs, which may be used by the server to authenticate the memory system.

20 Claims, 5 Drawing Sheets

GENERATING A SHARED SECRET FOR AN ELECTRONIC SYSTEM

CROSS REFERENCE

The present application for patent claims priority to U.S. Patent Application No. 63/402,626 by Dover, entitled "GENERATING A SHARED SECRET FOR AN ELECTRONIC SYSTEM" and filed Aug. 31, 2022, which is assigned to the assignee hereof and is expressly incorporated by reference herein.

FIELD OF TECHNOLOGY

The following relates to generating a shared secret for an electronic system, such as a memory system comprising one or more memory devices.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

In some cases, a manufacturer of a memory system may incorporate methods to support future verification of the validity of the memory system. For example, the memory system may include a unique identifier, such as a unique device secret (UDS) used to generate a certificate (e.g., using a cryptographic key), which may be verified by a third party. However, in some examples, the memory system may communicate the unique identifier (e.g., as part of manufacturing) to a server or cloud associated with the third party or manufacturer, which may expose the unique identifier to security vulnerabilities. For example, a malicious party may intercept the unique identifier during transmission, or the unique identifier may become corrupted during transmission. Such vulnerabilities may reduce security and expose the manufacturer, third party, memory system, or a combination thereof to cyber-attacks. Accordingly, improved techniques to support the authentication (e.g., verification of the validity of) a memory system are desired.

As described herein, a server and a memory system may derive a shared secret using a secure key exchange operation without transmitting sensitive or secret information. For example, the memory system may identify an initial key pair (e.g., a public key and a private key), and may exchange the public key with a public key associated with the server. The memory system and the server may subsequently each generate a shared secret (e.g., using a function associate with a Diffie-Hellman key exchange operation). In some examples, the memory system and the server may use the shared secret to generate a device identifier (e.g., a compound device identity (CDI)) for the memory system, for example by incorporating the device identifier into a cryptographic representation of a software layer of the memory system. The memory system and the server may use the device identifier to generate one or more asymmetric key pairs, which may allow the server to authenticate the memory system without communicating the device identifier between the server and the memory system. Although examples are described herein in the context of a memory system, it is to be understood that the teachings herein may also be applied to in the context of other types of electronic systems, such as other types of semiconductor systems or devices that may make use of a shared secret.

Figure 1:
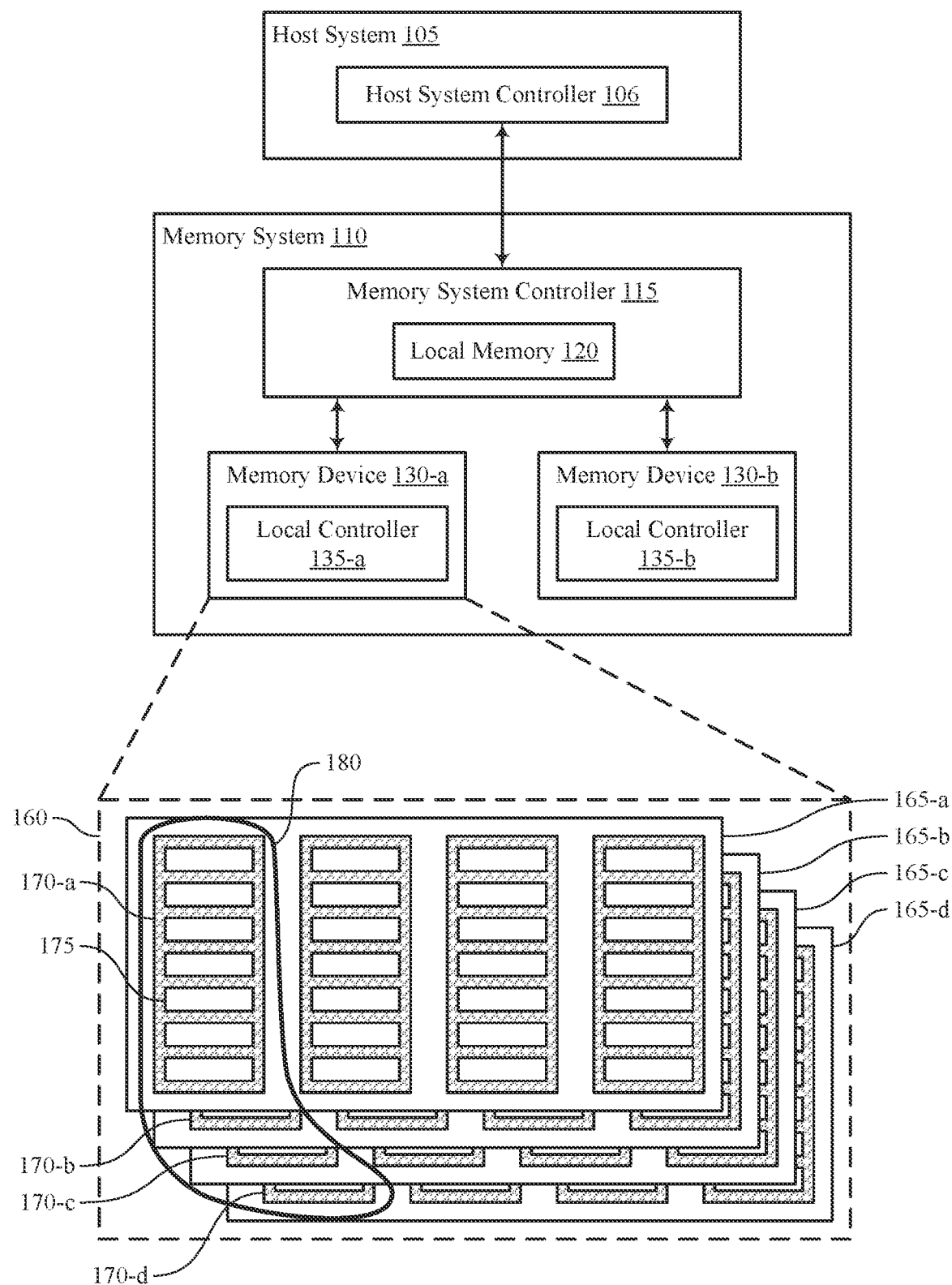
FIG. 1 illustrates an example of a system that supports techniques for generating a shared secret for an electronic system in accordance with examples as disclosed herein.

Features of the disclosure are initially described in the context of systems, devices, and circuits with reference to FIG. 1. Features of the disclosure are described in the context of a system and a process flow with reference to FIGS. 2 through 3. These and other features of the disclosure are further illustrated by and described in the context of an apparatus diagram and flowchart that relate to techniques for generating a shared secret for an electronic system with reference to FIGS. 4 through 5.

FIG. 1 illustrates an example of a system 100 that supports techniques for generating a shared secret for an electronic system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STf)-MRAM, conductive bridging RAM (CBRAM), resistive random access memory (RRAM), oxide-based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques for generating a shared secret for an electronic system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, the system 100 may be in communication with a server, and the memory system 110 and server may derive a shared secret using a secure key exchange operation without transmitting sensitive or secret information. For example, the memory system 110 may identify an initial key pair (e.g., a public key and a private key), and may exchange the public key with a public key associated with the server. The memory system 110 and the server may subsequently each generate a shared secret (e.g., using a function associate with a Diffie-Hellman key exchange operation). In some examples, the memory system 110 and the server may use the shared secret to generate a device identifier (e.g., a compound device identity (CDI)) for the memory system 110, for example by incorporating the device identifier into a cryptographic representation of a software layer of the memory system 110. The memory system 110 and the server may use the device identifier to generate one or more asymmetric key pairs, which may allow the server to authenticate the memory system 110 without communicating the device identifier between the server and the memory system 110.

Figure 2:
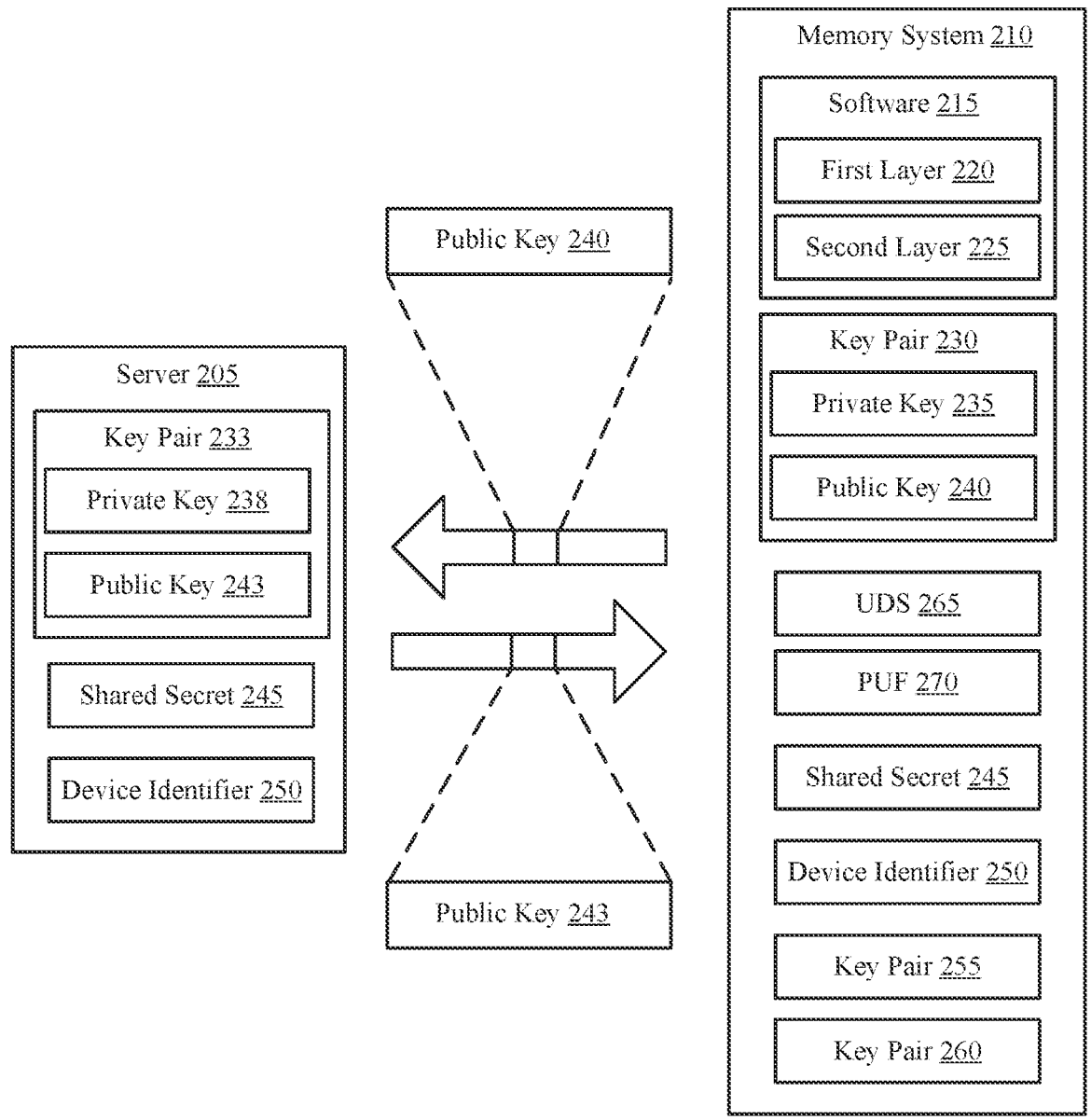
FIG. 2 illustrates an example of a system that supports techniques for generating a shared secret for an electronic system in accordance with examples as disclosed herein.

FIG. 2 illustrates an example of a system 200 that supports techniques for generating a shared secret for an electronic system in accordance with examples as disclosed herein. The system 200 may include aspects of the system 100. For example, the system 200 may include a memory system 210, which may be an example of the memory system 110 as described with reference to FIG. 2. The memory system 210 may be integrated with or in communication with a host system (e.g., a host system 105) to form a computing system. In some examples, the computing system may communicate with a server 205. The server 205 may be a cloud server, which may be described as a virtual server that may be accessed by devices remotely over a network. As such, devices in communication with the server 205 (e.g., computing system, including the host system, the memory system 210, or both) may include components that enable network capabilities. Alternatively, other devices that are coupled or included with the computing system may include components that enable network capabilities.

In some examples, the server 205 may be owned and managed by a manufacturer of the memory system 210 and may store (e.g., in a repository) secure identifiers associated with the memory system 210, and in some cases may store one or more copies of software 215 stored in the memory system 210. For example, the memory system 210 and the server 205 may store one or more layers of software 215 used to initialize and operate the computing system, such as a first layer 220 and a second layer 225. In some cases, the first layer 220 may be an example of initialization instructions for the computing system (e.g., boot code, L0 code), and the second layer 225 may be an example of an operating system for the computing system (e.g., an operation system kernel. L1 code). In some cases, the server 205 may authenticate or validate aspects of the memory system 210 using both software characteristics, such as the layers of software 215, and hardware characteristics, such as the secure identifiers associated with the memory system 210, for example as part of a device identification composition engine (DICE) protocol. However, communicating secure identifier between the memory system 210 and the server 205 may introduce vulnerabilities, such as corruption of the secure identifiers or interception of the secure identifiers by malicious parties. To reduce vulnerabilities, the server 205 and the memory system 210 may each determine a same secure identifier without communicating secure information.

For example, the memory system 210 may internally identify an initial key pair 230, which may include a private key 235 and a public key 240. In some cases, the memory system may first identify the private key 235 and use the private key 235 to generate the public key 240 (e.g., using a key generation algorithm, such as elliptic curve cryptography). Further, the server may internally identify a key pair 233, which may include a private key 238 and a public key 243.

In some cases, the memory system 210 may use one or more hardware characteristics to identify the private key 235. For example, the private key 235 may correspond to or may be based on a unique device secret (UDS) 265 of the memory system 210. The UDS 265 may represent or provide a hardware-based secret identity, such as a deterministic key that is specific to memory system 210, which may be stored in fuses or read-only memory.

Additionally or alternatively, the private key 235 may correspond to or may be based on a physical unclonable function (PUF) 270. The PUF 270 may include various components or circuit elements that have an intrinsic physical characteristic that is unique to the PUF 270, which may be leveraged to establish an intrinsic uniqueness of the memory system 210. For example, the PUF 270 may include a set of one or more transistors, resistors, capacitors, memory cells (e.g., SRAM cells, which may, in some cases, be included in local memory 120 of the memory system 110 described with reference to FIG. 1), or other circuit elements or combination thereof which, if accessed, support the generation of a digital signature that is unique to the memory system 210.

The memory system 210 and the server 205 may exchange respective public keys as part of a key exchange operation, such as a Diffie-Hellman key exchange, and may each generate a same shared secret 245 based on the exchanged keys. For example, the memory system 210 may obtain the public key 243 of the server 205, and the memory system 210 may expose or output the public key 240 of the memory system 210 to the server. In some examples, exchanging the public keys may occur as part of a manufacturing operation of the memory system 210 (e.g., a manufacturer may provide the public key 243 to the memory system 210, and may upload or provide the public key 240 to the server 205). Additionally or alternatively, the memory system 210 and the server 205 may communicate the public keys, for example over a network implemented by the computing system and the server 205.

Upon communicating the public keys, the memory system 210 may use the public key 243 and the private key 235 to generate a shared secret 245, for example using an algorithm or function included as part the Diffie-Hellman key exchange. Similarly, the server 205 may use the public key 240 and the private key 238 to generate the shared secret 245. Because the key exchange operation may be used to generate the shared secret 245, the shared secret 245 may not be communicated externally from the server 205 or the memory system 210, which may allow the memory system 210 and the server 205 to use the shared secret 245 as part of cryptographic security protocols, such as a device identifier composition engine (DICE) protocol.

The memory system 210, the server 205, or both may use the shared secret 245 as a hardware component for generating a device identifier 250, such as CDI. For example, the memory system 210 and the server 205 may incorporate the shared secret 245 into a cryptographic representation of the first layer 220 (e.g., the L0 code), such as by performing a hashing operation of the first layer 220 and the shared secret 245. The output of the hashing operation (e.g., the digest) may correspond to or may be used as the device identifier 250.

In some examples, the memory system 210, the server 205, or both may generate one or more sets of key pairs, such as an asymmetric key pair 255 (e.g., a DeviceID (DID) asymmetric key pair), an asymmetric key pair 260 (e.g., an Alias asymmetric key pair), or both. For example, a private key of the key pair 255 may correspond to the device identifier 250, and the memory system 210, the server 205, or both may generate the public key of the key pair 255 using a key generation algorithm (e.g., elliptic curve cryptography). Additionally or alternatively, a private key of the key pair 260 may correspond to or may be based on a digest of a hashing function of the device identifier 250 and the second layer 225 (e.g., the L1 code), and the memory system 210, the server 205, or both may generate the public key of the key pair 260 using a key generation algorithm (e.g., elliptic curve cryptography).

Figure 3:
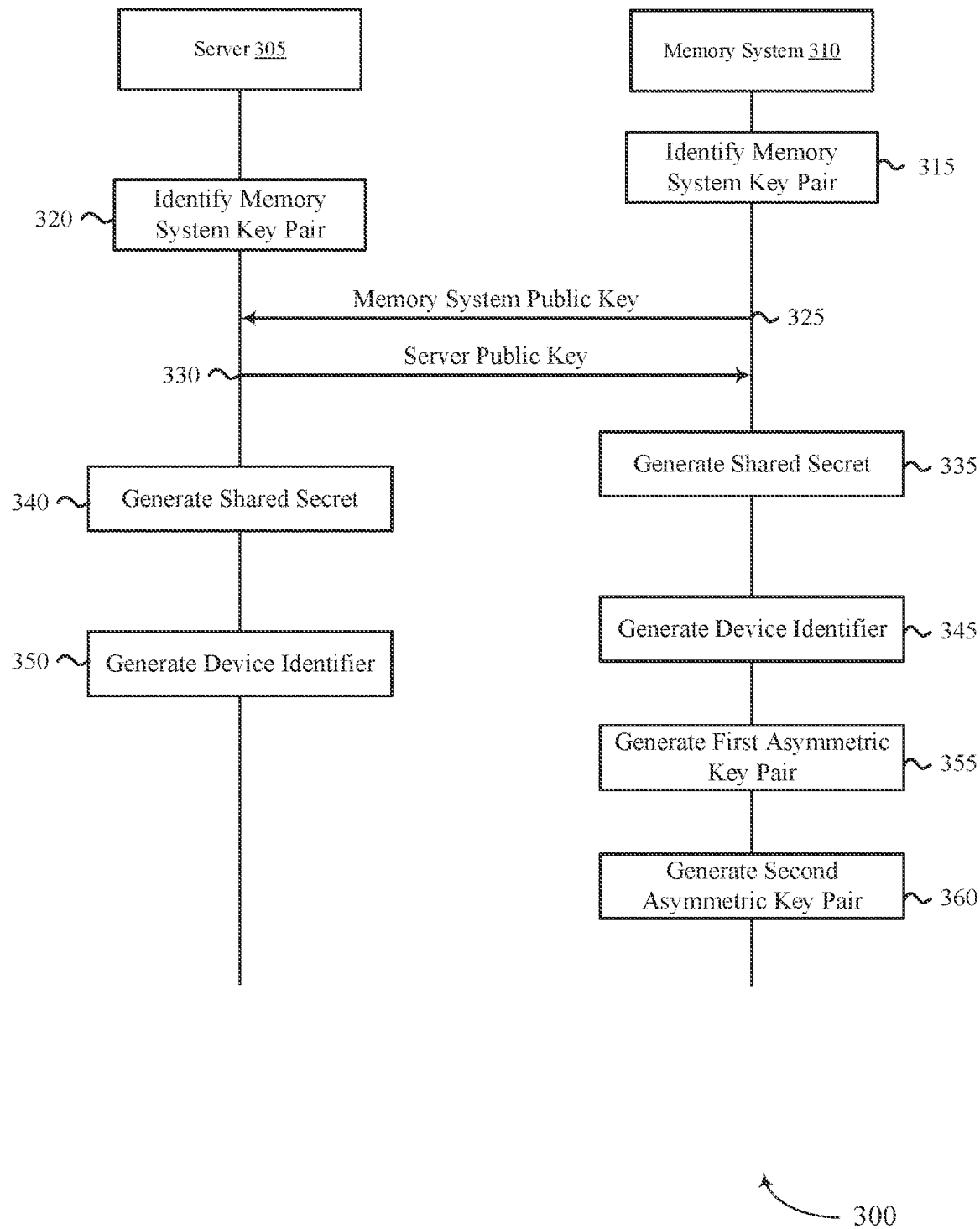
FIG. 3 illustrates an example of a process flow that supports techniques for generating a shared secret for an electronic system in accordance with examples as disclosed herein.

FIG. 3 illustrates an example of a process flow 300 that supports techniques for generating a shared secret for an electronic system in accordance with examples as disclosed herein. The process flow 300 may include aspects of the system 100 and of the system 200. For example, the process flow 300 may include a server 305, which may be an example of the server 205 as described with reference to FIG. 2. The process flow 300 may also include a memory system 310, which may be an example of the memory system 210 as described with reference to FIG. 2. In some examples, the memory system 310 may be coupled with a host system (e.g., a host system 105) to form a computing system, which may communicate with the server 305 (e.g., via a network). The server 305 may be a cloud server, which may be described as a virtual server that may be accessed by devices remotely over a network.

At 315, an initial key pair associated with the memory system 310 may be identified. For example, the memory system may internally identify a private key and a public key of the initial key pair. In some examples, the memory system 310 may first identify the private key and use the private key to generate the public key (e.g., using a key generation algorithm, such as elliptic curve cryptography). In some examples, the private key may be based on or may correspond to a hardware factor (e.g., a UDS or a PUF) of the memory system 310.

At 320, a key pair associated with the memory system 310 may be identified. For example, the server 305 may internally identify the key pair, which may include a private key and a public key. In some examples, the server 305 may identify the key pair in a manner similar to the memory system 310. In some examples, at the time of manufacture, the server 305 may store a copy of the key pair associated with the memory system 310. In some other examples, the server 305 may store a copy of data used to derive the key pair associated with the memory system 310.

At 325, a public key of the memory system 310 may be communicated. For example, the server 305 may obtain the public key of the memory system 310. In some cases, the memory system 310 may transmit its respective public key to the server 305, for example over a network implemented by a computing system. In some other cases, as part of a manufacturing operation of the memory system 310, the server 305 may store a copy of the public key of the memory system 310.

At 330, a public key of the server 305 may be communicated. For example, the memory system 310 may obtain the public key of the server 305. In some cases, the server 305 may transmit the public key to the memory system 310, for example over a network implemented by a computing system. In some examples, exchanging the public keys may occur as part of a manufacturing operation of the memory system 310.

At 335, a shared secret between the memory system 310 and the server 305 may be generated. For example, the memory system 310 may generate the shared secret using the public key of the server 305 and the private key of the memory system 310. In some cases, the memory system 310 may generate the shared secret using an algorithm or function included as part of a key exchange operation, such as a Diffie-Hellman key exchange.

At 340, the shared secret between the memory system 310 and the server 305 may be generated. For example, the server 305 may generate the shared secret using the public key of the memory system 310 and the private key of the server 305. In some other cases, the server 305 may store a copy of the shared secret in memory, based on information (e.g., a public key or hardware factor information of the memory system 310) stored at the time of manufacture of the memory system 310. Because the shared secret may not be communicated externally from the memory system 310 and the server 305, and because the memory system 310 and the server 305 may generate a same shared secret, the memory system 310 and the server 305 may use the shared secret as part of cryptographic security protocols, such as a DICE protocol.

At 345, a device identifier, such as a CDI, associated with the memory system 310 may be generated. For example, the memory system 310 may generate the device identifier, using a DICE procedure, by incorporating the shared secret into a cryptographic representation of a first software layer (e.g., the L0 code) of the memory system 310, such as by performing a hashing operation of the first software layer and the shared secret. The output of the hashing operation may correspond to or may be used as the device identifier.

At 350, the device identifier associated with the memory system 310 may be generated. For example, the server 305 may generate the device identifier. In some examples the server 305 may obtain, and store in memory, data corresponding to the one or more software layers of the memory system 310, including the cryptographic representation of the first software layer of the memory system 310. The server 305 may generate the device identifier by incorporating the shared secret into a cryptographic representation of the first software layer of the memory system 310 in a manner similar to the memory system 310. Thus, the memory system 310 and the server 305 may generate a same device identifier.

At 355, a first asymmetric key pair associated with the memory system 310, such as a DID, may be generated. For example, the memory system 310, the server 305, or both may generate the first asymmetric key pair, including a private key and a public key. The private key of the first asymmetric key pair may correspond to or may derive from the device identifier. The memory system 310, the server 305, or both may generate the public key of the first asymmetric key pair using a key generation algorithm (e.g., elliptic curve cryptography) based on the private key of the first asymmetric key pair.

At 360, a second asymmetric key pair associated with the memory system 310, such as an alias key, may be generated. For example, the memory system 310, the server 305, or both may generate the second asymmetric key pair, including a private key and a public key. The private key of the second asymmetric key pair may correspond to or may derive from a digest of a hashing function of the device identifier and a second software layer (e.g., the L1 code) of the memory system 310. The memory system 310, the server 305, or both may generate the public key of the second asymmetric key pair using a key generation algorithm (e.g., elliptic curve cryptography) based on the private key of the second asymmetric key pair.

Aspects of the process flow 300 may be implemented by a controller, among other components. Additionally or alternatively, aspects of the process flow 300 may be implemented as instructions stored in memory (e.g., firmware stored in a memory coupled with the memory system 310). For example, the instructions, if executed by a controller (e.g., the memory system controller 115), may cause the controller to perform the operations of the process flow 300.

Figure 4:
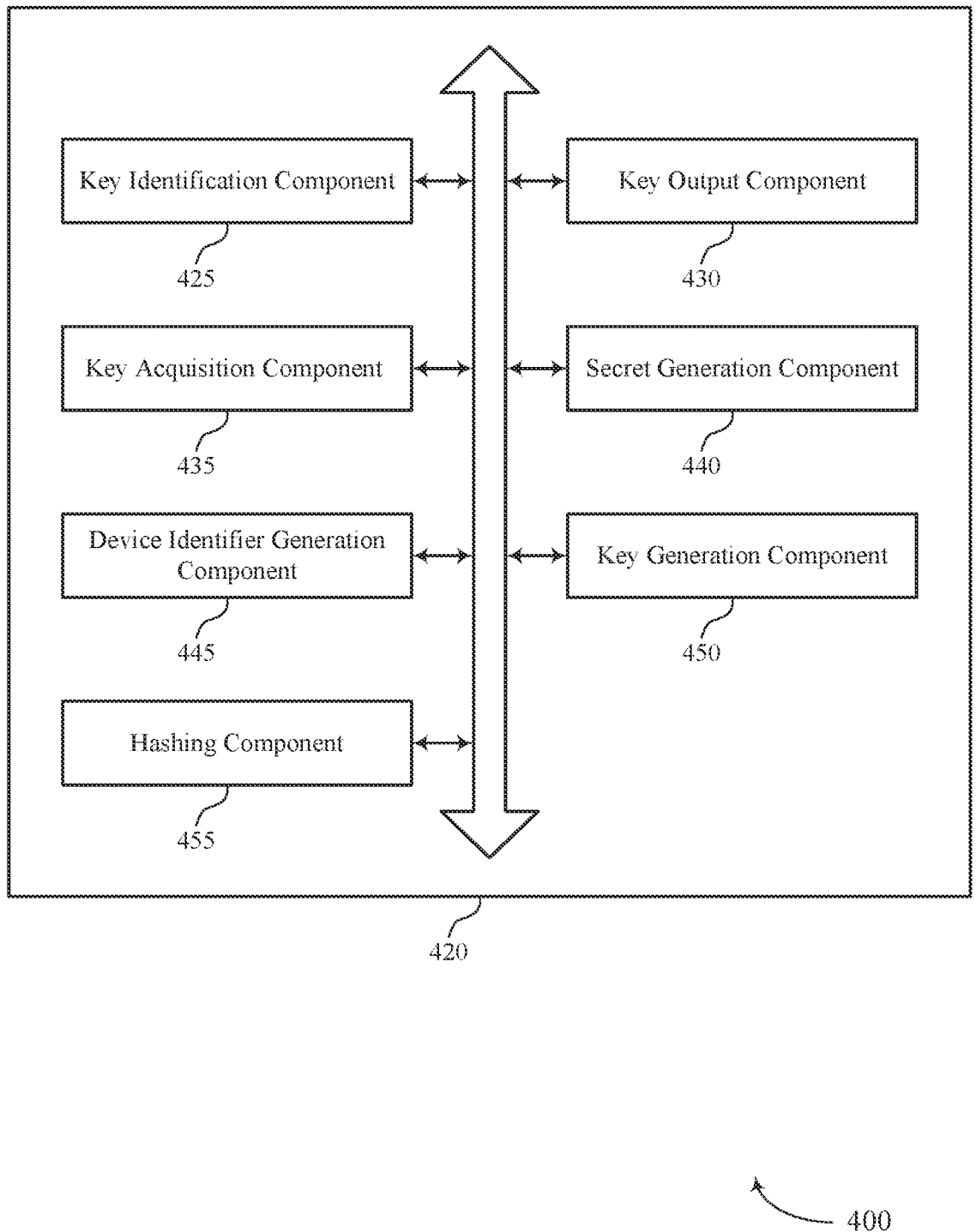
FIG. 4 shows a block diagram of a memory system that supports techniques for generating a shared secret for an electronic system in accordance with examples as disclosed herein.

FIG. 4 shows a block diagram 400 of a memory system 420 that supports techniques for generating a shared secret for an electronic system in accordance with examples as disclosed herein. The memory system 420 may be an example of aspects of a memory system as described with reference to FIGS. 1 through 3. The memory system 420, or various components thereof, may be an example of means for performing various aspects of techniques for generating a shared secret for an electronic system as described herein. For example, the memory system 420 may include a key identification component 425, a key output component 430, a key acquisition component 435, a secret generation component 440, a device identifier generation component 445, a key generation component 450, a hashing component 455, or any combination thereof. Each of these components may communicate, directly or indirectly, with one another (e.g., via one or more buses).

The key identification component 425 may be configured as or otherwise support a means for identifying, at a memory device, a key pair including a public key associated with the memory device and a private key associated with the memory device. The key output component 430 may be configured as or otherwise support a means for outputting, from the memory device, the public key associated with the memory device. The key acquisition component 435 may be configured as or otherwise support a means for obtaining, at the memory device, a public key associated with a server. The secret generation component 440 may be configured as or otherwise support a means for generating, at the memory device, a shared secret between the memory device and the server based at least in part on the private key associated with the memory device and the public key associated with the server. The device identifier generation component 445 may be configured as or otherwise support a means for generating, at the memory device, a device identifier for the memory device based at least in part on the shared secret and a cryptographic representation of a software layer of the memory device.

In some examples, the key generation component 450 may be configured as or otherwise support a means for generating a first asymmetric key pair based at least in part on the device identifier and the cryptographic representation of the software layer.

In some examples, to support generating the first asymmetric key pair, the key generation component 450 may be configured as or otherwise support a means for generating a public key of the first asymmetric key pair based at least in part on a private key of the first asymmetric key pair, where the private key of the first asymmetric key pair corresponds to the device identifier.

In some examples, the key generation component 450 may be configured as or otherwise support a means for generating a second asymmetric key pair based at least in part on the device identifier and a second cryptographic representation of a second software layer of the memory device.

In some examples, to support generating the second asymmetric key pair, the hashing component 455 may be configured as or otherwise support a means for performing a hashing function on the device identifier and the second cryptographic representation of the second software layer, where a private key of the second asymmetric key pair is based at least in part on an output of the hashing function. In some examples, to support generating the second asymmetric key pair, the key generation component 450 may be configured as or otherwise support a means for generating a public key of the second asymmetric key pair based at least in part on the private key of the second asymmetric key pair.

In some examples, the second software layer of the memory device includes an operating system for a computing system that includes the memory device.

In some examples, to support generating the device identifier, the hashing component 455 may be configured as or otherwise support a means for performing a hashing function on the shared secret and the cryptographic representation of the software layer, where the device identifier is based at least in part on an output of the hashing function.

In some examples, to support identifying the key pair, the key generation component 450 may be configured as or otherwise support a means for generating the private key of the identified key pair based at least in part on a unique device secret of the memory device, wherein the public key of the identified key pair is derived from the private key.

In some examples, to support identifying the key pair, the key generation component 450 may be configured as or otherwise support a means for generating the private key of the identified key pair based at least in part on a physically unclonable function of the memory device, wherein the public key of the identified key pair is derived from the private key.

In some examples, the cryptographic representation of the software layer of the memory device is based at least in part on a digest of the software layer.

In some examples, the software layer includes initialization instructions for a computing system that includes the memory device.

Figure 5:
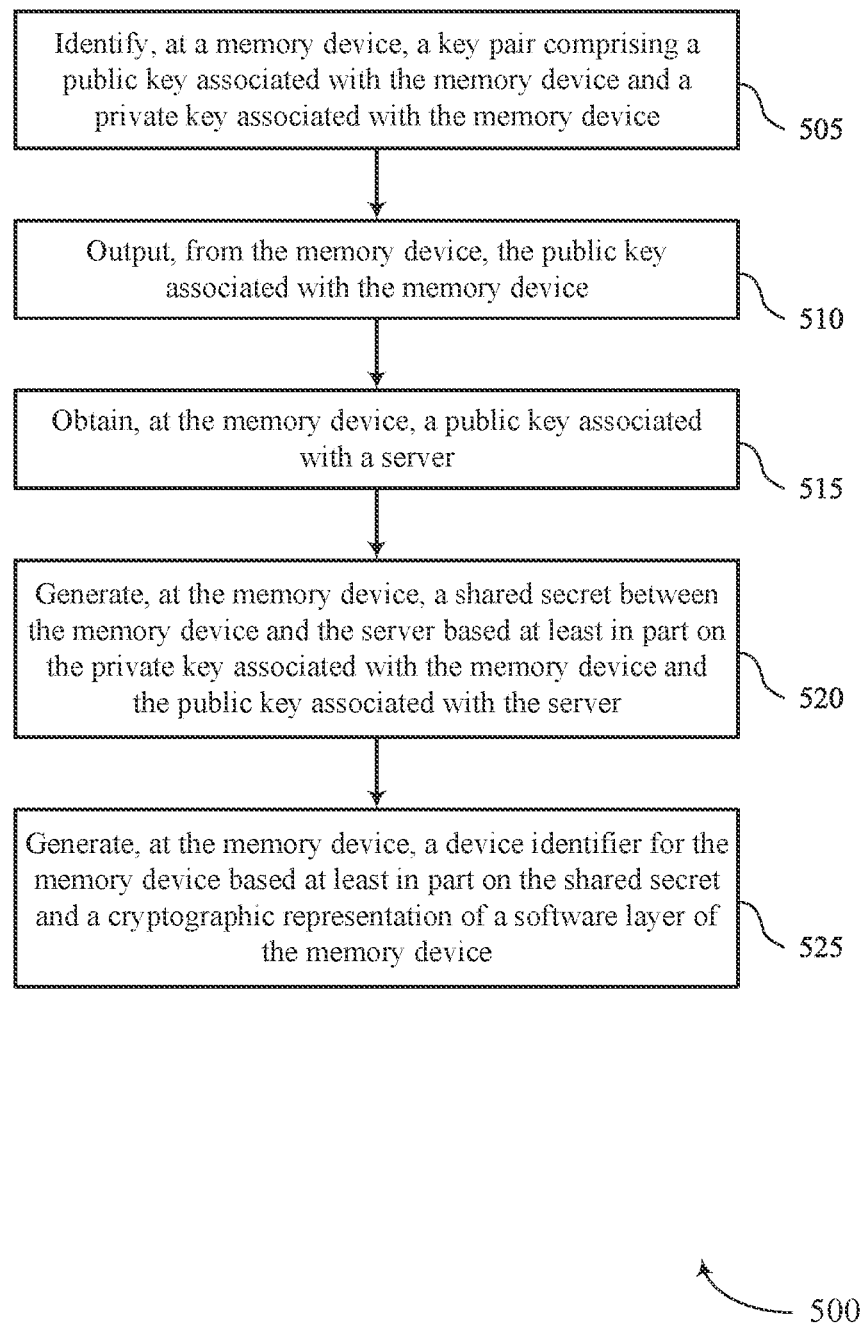
FIG. 5 shows a flowchart illustrating a method or methods that support techniques for generating a shared secret for an electronic system in accordance with examples as disclosed herein.

FIG. 5 shows a flowchart illustrating a method 500 that supports techniques for generating a shared secret for an electronic system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include identifying, at a memory device, a key pair including a public key associated with the memory device and a private key associated with the memory device. The operations of 505 may be performed in accordance with examples as disclosed herein. In some examples, aspects of the operations of 505 may be performed by a key identification component 425 as described with reference to FIG. 4.

At 510, the method may include outputting, from the memory device, the public key associated with the memory device. The operations of 510 may be performed in accordance with examples as disclosed herein. In some examples, aspects of the operations of 510 may be performed by a key output component 430 as described with reference to FIG. 4.

At 515, the method may include obtaining, at the memory device, a public key associated with a server. The operations of 515 may be performed in accordance with examples as disclosed herein. In some examples, aspects of the operations of 515 may be performed by a key acquisition component 435 as described with reference to FIG. 4.

At 520, the method may include generating, at the memory device, a shared secret between the memory device and the server based at least in part on the private key associated with the memory device and the public key associated with the server. The operations of 520 may be performed in accordance with examples as disclosed herein. In some examples, aspects of the operations of 520 may be performed by a secret generation component 440 as described with reference to FIG. 4.

At 525, the method may include generating, at the memory device, a device identifier for the memory device based at least in part on the shared secret and a cryptographic representation of a software layer of the memory device. The operations of 525 may be performed in accordance with examples as disclosed herein. In some examples, aspects of the operations of 525 may be performed by a device identifier generation component 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying, at a memory device, a key pair including a public key associated with the memory device and a private key associated with the memory device; outputting, from the memory device, the public key associated with the memory device; obtaining, at the memory device, a public key associated with a server; generating, at the memory device, a shared secret between the memory device and the server based at least in part on the private key associated with the memory device and the public key associated with the server; and generating, at the memory device, a device identifier for the memory device based at least in part on the shared secret and a cryptographic representation of a software layer of the memory device.

Aspect 2: The method, apparatus, or non-transitory computer-readable medium of aspect 1, further including operations, features, circuitry, logic, means, or instructions, or any combination thereof for generating a first asymmetric key pair based at least in part on the device identifier and the cryptographic representation of the software layer.

Aspect 3: The method, apparatus, or non-transitory computer-readable medium of aspect 2, where the operations, features, circuitry, logic, means, or instructions, or any combination thereof for generating the first asymmetric key pair includes operations, features, circuitry, logic, means, or instructions, or any combination thereof for generating a public key of the first asymmetric key pair based at least in part on a private key of the first asymmetric key pair, where the private key of the first asymmetric key pair corresponds to the device identifier.

Aspect 4: The method, apparatus, or non-transitory computer-readable medium of any of aspects 2 through 3, further including operations, features, circuitry, logic, means, or instructions, or any combination thereof for generating a second asymmetric key pair based at least in part on the device identifier and a second cryptographic representation of a second software layer of the memory device.

Aspect 5: The method, apparatus, or non-transitory computer-readable medium of aspect 4, where operations, features, circuitry, logic, means, or instructions, or any combination thereof for generating the second asymmetric key pair includes operations, features, circuitry, logic, means, or instructions, or any combination thereof for performing a hashing function on the device identifier and the second cryptographic representation of the second software layer, where a private key of the second asymmetric key pair is based at least in part on an output of the hashing function, and generating a public key of the second asymmetric key pair based at least in part on the private key of the second asymmetric key pair.

Aspect 6: The method, apparatus, or non-transitory computer-readable medium of any of aspects 4 through 5, where the second software layer of the memory device includes an operating system for a computing system that includes the memory device.

Aspect 7: The method, apparatus, or non-transitory computer-readable medium of any of aspects 1 through 6, where the operations, features, circuitry, logic, means, or instructions, or any combination thereof for generating the device identifier includes operations, features, circuitry, logic, means, or instructions, or any combination thereof for performing a hashing function on the shared secret and the cryptographic representation of the software layer, where the device identifier is based at least in part on an output of the hashing function.

Aspect 8: The method, apparatus, or non-transitory computer-readable medium of any of aspects 1 through 7, where the operations, features, circuitry, logic, means, or instructions, or any combination thereof for identifying the key pair includes operations, features, circuitry, logic, means, or instructions, or any combination thereof for generating the private key of the identified key pair based at least in part on a unique device secret of the memory device, wherein the public key of the identified key pair is derived from the private key.

Aspect 9: The method, apparatus, or non-transitory computer-readable medium of any of aspects 1 through 8, where the operations, features, circuitry, logic, means, or instructions, or any combination thereof for identifying the key pair includes operations, features, circuitry, logic, means, or instructions, or any combination thereof for generating the private key of the identified key pair based at least in part on a physically unclonable function of the memory device, wherein the public key of the identified key pair is derived from the private key.

Aspect 10: The method, apparatus, or non-transitory computer-readable medium of any of aspects 1 through 9, where the cryptographic representation of the software layer of the memory device is based at least in part on a digest of the software layer.

Aspect 11: The method, apparatus, or non-transitory computer-readable medium of any of aspects 1 through 10, where the software layer includes initialization instructions for a computing system that includes the memory device.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims. "or" as used in a list of items (for example, a list of items prefaced by a phrase such as "at least one of" or "one or more of") indicates an inclusive list such that, for example, a list of at least one of A. B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller for the memory device, wherein the controller is configured to cause the apparatus to:
   identify, at the memory device, a key pair comprising a public key associated with the memory device and a private key associated with the memory device;
   output, from the memory device, the public key associated with the memory device;
   obtain, at the memory device, a public key associated with a server;
   generate, at the memory device, a shared secret between the memory device and the server based at least in part on the private key associated with the memory device and the public key associated with the server; and
   generate, at the memory device, a device identifier for the memory device based at least in part on the shared secret and a cryptographic representation of a software layer of the memory device.

2. The apparatus of claim 1, wherein the controller is further configured to cause the apparatus to:
   generate a first asymmetric key pair based at least in part on the device identifier and the cryptographic representation of the software layer.

3. The apparatus of claim 2, wherein, to generate the first asymmetric key pair, the controller is configured to cause the apparatus to:
   generate a public key of the first asymmetric key pair based at least in part on a private key of the first asymmetric key pair, wherein the private key of the first asymmetric key pair corresponds to the device identifier.

4. The apparatus of claim 2, wherein the controller is further configured to cause the apparatus to:
   generate a second asymmetric key pair based at least in part on the device identifier and a second cryptographic representation of a second software layer of the memory device.

5. The apparatus of claim 4, wherein, to generate the second asymmetric key pair, the controller is configured to cause the apparatus to:

perform a hashing function on the device identifier and the second cryptographic representation of the second software layer, wherein a private key of the second asymmetric key pair is based at least in part on an output of the hashing function; and generate a public key of the second asymmetric key pair based at least in part on the private key of the second asymmetric key pair.

6. The apparatus of claim 4, wherein the second software layer of the memory device comprises an operating system for a computing system that comprises the memory device.

7. The apparatus of claim 1, wherein, to generate the device identifier, the controller is configured to cause the apparatus to:

perform a hashing function on the shared secret and the cryptographic representation of the software layer, wherein the device identifier is based at least in part on an output of the hashing function.

8. The apparatus of claim 1, wherein, to identify the key pair, the controller is configured to cause the apparatus to:

generate the private key of the identified key pair based at least in part on a unique device secret of the memory device, wherein the public key of the identified key pair is derived from the private key.

9. The apparatus of claim 1, wherein, to identify the key pair, the controller is configured to cause the apparatus to:

generate the private key of the identified key pair based at least in part on a physically unclonable function of the memory device, wherein the public key of the identified key pair is derived from the private key.

10. The apparatus of claim 1, wherein the cryptographic representation of the software layer of the memory device is based at least in part on a digest of the software layer.

11. The apparatus of claim 1, wherein the software layer comprises initialization instructions for a computing system that comprises the memory device.

12. A non-transitory computer-readable medium storing code comprising instructions which, when executed by a processor of an electronic device, cause the electronic device to:

identify, at a memory device, a key pair comprising a public key associated with the memory device and a private key associated with the memory device;

output, from the memory device, the public key associated with the memory device;

obtain, at the memory device, a public key associated with a server;

generate, at the memory device, a shared secret between the memory device and the server based at least in part on the private key associated with the memory device and the public key associated with the server; and generate, at the memory device, a device identifier for the memory device based at least in part on the shared secret and a cryptographic representation of a software layer of the memory device.

13. The non-transitory computer-readable medium of claim 12, wherein the instructions, when executed by the processor of the electronic device, further cause the electronic device to:

generate a first asymmetric key pair based at least in part on the device identifier and the cryptographic representation of the software layer.

14. The non-transitory computer-readable medium of claim 13, wherein, to generate the first asymmetric key pair, the instructions, when executed by the processor of the electronic device, cause the electronic device to:

generate a public key of the first asymmetric key pair based at least in part on a private key of the first asymmetric key pair, wherein the private key of the first asymmetric key pair corresponds to the device identifier.

15. The non-transitory computer-readable medium of claim 13, wherein the instructions, when executed by the processor of the electronic device, further cause the electronic device to:

generate a second asymmetric key pair based at least in part on the device identifier and a second cryptographic representation of a second software layer of the memory device.

16. The non-transitory computer-readable medium of claim 12, wherein, to generate the device identifier, the instructions, when executed by the processor of the electronic device, cause the electronic device to:

perform a hashing function on the shared secret and the cryptographic representation of the software layer, wherein the device identifier is based at least in part on an output of the hashing function.

17. The non-transitory computer-readable medium of claim 12, wherein, to identify the key pair, the instructions, when executed by the processor of the electronic device, cause the electronic device to:

generate the private key of the identified key pair based at least in part on a unique device secret of the memory device, wherein the public key of the identified key pair is derived from the private key.

18. The non-transitory computer-readable medium of claim 12, wherein, to identify the key pair, the instructions, when executed by the processor of the electronic device, cause the electronic device to:

generate the private key of the identified key pair based at least in part on a physically unclonable function of the memory device, wherein the public key of the identified key pair is derived from the private key.

19. The non-transitory computer-readable medium of claim 12, wherein the software layer comprises initialization instructions for a computing system that comprises the memory device.

20. A method, comprising:

identifying, at a memory device, a key pair comprising a public key associated with the memory device and a private key associated with the memory device;

outputting, from the memory device, the public key associated with the memory device;

obtaining, at the memory device, a public key associated with a server;

generating, at the memory device, a shared secret between the memory device and the server based at least in part on the private key associated with the memory device and the public key associated with the server; and generating, at the memory device, a device identifier for the memory device based at least in part on the shared secret and a cryptographic representation of a software layer of the memory device.

* * * * *